3,053,791
COMPOSITION COMPRISING POLYVINYL CHLORIDE CLAY, AND THE REACTION PRODUCT OF A HALOSILANE AND AN ALCOHOL
Ivan Mankowich, Cheshire, and Raymond A. Chartier, Naugatuck, Conn., assignors to United States Rubber Company, New York, N.Y., a corporation of New Jersey
No Drawing. Filed July 7, 1960, Ser. No. 41,260
2 Claims. (Cl. 260—41)

This invention relates to the heat-stabilization of vinyl chloride resins, and more particularly it relates to the heat-stabilization of such resins containing a clay filler, by incorporating therein a reaction product of a hydrocarbon halosilane with an aliphatic oxygen compound.

The vinyl chloride resins employed in the invention include the ordinary hard, gamma vinyl chloride homopolymer resin of commerce, as well as the conventional modified vinyl chloride resins typically made by copolymerizing vinyl chloride with a minor amount (e.g., 1% to 49%) of one or more copolymerizable monoethylenically unsaturated monomers, such as vinyl acetate, vinylidene chloride, vinyl stearate, dilauryl maleate, or similar monomers. A serious disadvantage of conventional vinyl chloride resins of this kind is that they suffer from a tendency to become discolored, and lose their physical properties, when exposed to elevated temperatures, either in processing or in use. Accordingly, the principal object of the present invention is to provide a novel way of preserving the vinyl chloride resin against such deterioration by exposure to heat.

The invention is based on the surprising discovery that vinyl chloride resin containing clay filler can be stabilized by means of a reaction product of a hydrocarbon halosilane with an aliphatic oxygen compound.

The invention has particular reference to vinyl chloride resin compositions containing clay as a filler. Usually the composition of the invention will contain from 5 parts to 300 parts by weight of clay, per 100 parts of vinyl chloride resin. The clay may be any conventional clay suitable for use as a filler in vinyl chloride resin, such as kaolin. A commercially available material of this kind is that known as "Suprex" clay which has clay-like particles of a wide distribution of sizes averaging approximately 5,000 Angstrom units and containing 14% of water of hydration. We may also use the commercially available clay known as Southern Clay Pigment 33 which has the following properties.

Fineness:
    Residue on 200 mesh screen__ Less than 0.2%.
    Residue on 325 mesh screen__ Less than 0.5%.
Particle size _____ 38%, below 2 microns.
Particle form _____ Virtually amorphous.
Water soluble salts _____ Less than 0.2%.
pH value _____ 6.0 to 6.2.
Chemical analysis:
    $Al_2O_3$ _____ 43.75%.
    $SiO_2$ _____ 54.00%.
    $Fe_2O_3$ _____ 0.25%.
    $TiO_2$ _____ 0.75%.
    $K_2O, Na_2O$ _____ 1.25%.
Ignition loss (1600° F., 1 hour)_ Under 3%.
Specific gravity _____ 2.55.

The reaction products of a hydrocarbon halosilane and an aliphatic oxygen compound employed in the invention are described in detail in U.S. Patents 2,680,124, issued June 1, 1954, and 2,831,828, issued April 22, 1958, to Brooks et al. The entire disclosures of those patents are hereby incorporated herein by reference, as disclosing the reaction products suitable for use in the invention. Such reaction products are employed, in accordance with the invention, in amount of from 2 to 6 parts by weight, per 100 parts of the clay filler. The polyvinyl chloride resin, clay filler, and hydrocarbon halosilane-aliphatic oxygen compound reaction product may be mixed together in any desired order although we usually mix the said reaction product first with the clay, and then incorporate the treated clay in the vinyl resin, using the mixing equipment and mixing conditions usually employed for compounding vinyl resin. Plasticizers or other compounding ingredients, such as other pigments or fillers, may be included in the mixture.

Thus, as described in 2,680,124, any aliphatic dialcohol, such as ethylene glycol, propylene glycol, trimethylene glycol, any of the butylene glycols, etc., and the polyglycols, which contain ether oxygen between carbon atoms in the chain, e.g., diethylene glycol, triethylene glycol, dipropylene glycol, etc. may be reacted with a cycloalkenyl- or cycloalkenylalkyltrichlorosilane, such as 3-cyclohexenyltrichlorosilane, 2-methyl-3-cyclohexenyltrichlorosilane, 3-methyl-3-cyclohexenyltrichlorosilane, beta-(3-cyclohexenyl) ethyltrichlorosilane or beta-(4-methyl-3-cyclohexenyl) propyltrichlorosilane, with liberation of hydrogen halide, the hydrogen of the hydrogen chloride coming from the alcoholic hydroxyl groups and the chlorine coming from the alicyclic trichlorosilane. The resulting products may be used in the present invention in the manner indicated herein.

Similarly, as disclosed in 2,831,828, organohalosilanes which may be used in the preparation of organo-organoxysilanes include:

Saturated aliphatic hydrocarbon halosilanes
Saturated cycloaliphatic hydrocarbon halosilanes
Cycloalkyenylhalosilanes
Cycloalkenylalkylhalosilanes
Omega-alkenylhalosilanes in which the alkenyl group contains at least 6 carbon atoms Halogen-reactive oxygen compounds which are reacted with organohalosilanes to form reaction products used in the invention include:

Saturated aliphatic monohydric alcohols
Saturated aliphatic dihydric alcohols (including both hydrocarbon diols and hydrocarbon ether-diols)
Oxiranes having the formula

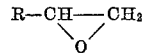

wherein R is hydrogen, methyl, or ethyl.

As noted in 2,831,828, when dihydric alcohols are employed, hydrogen halide is evolved and the products are polymeric organo-organoxysilanes which are liquids and free-flowing at ambient temperatures, and which are substantially free of hydrolyzable halogen. When monohydric alcohols are used as the halogen-reactive ingredient, monomeric products of definite known structure, that are substantially free of hydrolyzable halogen are formed. Examples of such reaction products are ethyltriethoxysilane, cyclohexenyltripropoxysilane, etc. On the other hand, when oxiranes are employed as the halogen-reactive ingredient they react directly with the organohalosilane by addition; the halogen of the silane becomes attached to the beta carbon atom of the oxirane, and the organosilyl becomes attached, through the oxygen atom, to the alpha carbon atom. Accordingly, an organo (chloroorganoxy)silane is formed as the reaction product. Hydrogen halide is not evolved in the reaction. Examples of such reaction products are propytri-(2-chloroethoxy)silane; cyclohexenyltri-(2-chloropropoxy) silane, etc. Specific examples of preferred alcohols and oxiranes (in addition to the glycols mentioned above) are: ethyl alcohol, n-propyl alcohol, n-butyl alcohol, ethylene oxide, propylene oxide (1,2). Preferred halogen-reactive oxygen compounds are the hydrocarbon diols, hydrocarbon ether-diols, $C_2$ to $C_4$ alkanols, and oxiranes containing not more than three carbon atoms per molecule. Specific examples of preferred organhalosilane used in preparing the organo-organoxysilanes (in addition to those mentioned previously) are ethyltrichlorosilane; anyltrichlorosilane; nonyltrichlorosilane; hexadecyltrichlorosilane; cyclohexyltrichlorosilane; undecenyltrichlorosilane; and diethyldichlorosilane.

Methods of making such reaction products are described in detail in 2,680,124 and 2,831,828.

The following examples, in which all parts are expressed by weight, will serve to illustrate the practice of the invention in more detail.

EXAMPLE 1

In this example, the resin employed is a commercially available vinyl chloride homopolymer resin known as "Marvinol VR–33." Mixtures containing varying proportions of a clay, known as #33 clay, are prepared, employing the amounts indicated in Table I. The compositions also include a plasticizer, dioctyl phthalate, but this is optional. Basic white lead silicate (optional) is included in the mixture. A small amount of stearic acid (optional lubricant) is also included in the compositions. The heat-stabilizing chemical employed in accordance with the invention is that described in Example I of 2,680,124, namely, the reaction product of diethylene glycol with 3-cyclohexenyltrichlorosilane. It is employed in the varying amounts indicated in Table I, and for purposes of comparison, it is omitted from certain of the compositions, as indicated in the table. To make the mixtures, all of the ingredients are blended together and worked on a roll mill at the temperature indicated in Table I in accordance with conventional practice, until a uniform composition is obtained. The mixtures are then molded into test specimens, and various tests are carried out, with the results noted in Table I. It will be observed from the data shown in Table I that the compositions of the invention, containing the specified treating chemical, in all cases have excellent physical properties, which are fully equivalent to the controls which do not contain such chemical. The most remarkable of the results shown in Table I resides in the oven heat stabilization test, which is carried out by heating a sample of the mixture in an oven at a temperature of 350° F. until the sample degrades from the heat, as evidenced by the development of a distinct yellow color. It will be observed that in compositions B, D, F and H, containing the treating chemical of the invention, the oven heat stability is remarkably improved in comparison to the control stocks, A, C, E and G, which do not contain the treating chemical. These results demonstrate the remarkable advantage of the composition of the invention from the standpoint of improved ability to withstand the adverse effects of elevated temperatures. Similar heat stability results are obtained with compositions similar to B, D, F and H, from which the optional ingredients such as basic white lead silicate have been omitted.

Table I

| Ingredients, parts by weight: | Stock | | | | | | | |
|---|---|---|---|---|---|---|---|---|
| | A | B | C | D | E | F | G | H |
| "Marvinol VR-33" | 100 | 100 | 100 | 100 | 100 | 100 | 100 | 100 |
| Dioctylphthalate | 50 | 50 | 50 | 50 | 50 | 50 | 50 | 50 |
| No. 33 clay | 10 | 10 | 50 | 50 | 100 | 100 | 200 | 200 |
| Basic white lead silicate | 6 | 6 | 6 | 6 | 6 | 6 | 6 | 6 |
| Stearic acid | 1 | 1 | 1 | 1 | 1 | 1 | 1 | 1 |
| Reaction product of diethylene glycol and 3-cyclohexenyltrichloroxosilane | | 0.6 | | 3 | | 6 | | 12 |
| Total | 167 | 167.6 | 207 | 210 | 257 | 263 | 357 | 369 |
| Milling temp., ° F | 310 | 210 | 320 | 320 | 340 | 340 | 340 | 340 |
| Tensile strength, p.s.i | 2,470 | 2,530 | 2,130 | 2,050 | 2,070 | 1,870 | 2,270 | 2,470 |
| Elongation-at-break, percent | 320 | 330 | 220 | 250 | 100 | 100 | | |
| Modulus at 100% elongation, p.s.i | 1,600 | 1,650 | 1,900 | 1,680 | 2,070 | 1,870 | | |
| Tear strength | 469 | 486 | 450 | 413 | 332 | 327 | 244 | 223 |
| Brittle point, ° C | −16 | −16 | −2 | −4 | +12 | +14 | | |
| Fail point, ° C | −18 | −18 | −4 | −5 | +10 | +12 | +30 | +30 |
| Oven heat stability at 350° F. (minutes) | 90 | 120 | 45 | 105 | 0 | 75 | 0 | 60 |

EXAMPLE 2

This example does not illustrate the invention, but is included for purposes of comparison with Example 1, to emphasize the fact that clay has to be present along with the hydrocarbon halosilane-aliphatic oxygen compound reaction product in order to achieve the stabilizing effect of the invention. This is true even if a conventional stabilizer such as barium-cadmium stearate ("Mark M") and/ or basic white lead silicate is present. The mixes are prepared as in Example 1, but instead of an oven heat stability test, a mill heat stability test is carried out, for convenience. The mill heat stability test is performed by milling the composition on a roll mill at a temperature of 330° F. until the material undergoes heat deterioration, as evidenced by the development of a distinct yellow color. Stock K shows that the composition containing diethylene glycol/3-cyclohexenyltrichlorosilane reaction product does not achieve any stabilizing effect in the absence of clay. This is in contrast to stock J, containing a conventional stabilizer ("Mark M"), which has good heat stability even in the absence of clay. Stock L demonstrates that there is no synergism between the conventional stabilizer and diethylene glycol/3 - cyclohexenyltrichlorosilane reaction product, in a composition containing no clay. Stocks M, N and O show that in the absence of clay, basic white lead silicate and various combinations of diethylene glycol/3-cyclohexenyltrichlorosilane reaction product with basic white lead silicate are ineffective. Addition of clay to the stocks produces a remarkable increase in heat stability in stocks K, L, N and O, which contain the diethylene glycol/3-cyclohexenyltrichlorosilane reaction product, but not in stocks J and M, which do not contain the diethylene glycol/3-cyclohexenyltrichlorosilane reaction product.

Tabl II

| Ingredients, parts by weight: | Stock | | | | | |
|---|---|---|---|---|---|---|
| | J | K | L | M | N | O |
| "Marvinol VR-33" | 100 | 100 | 100 | 100 | 100 | 100 |
| Dioctyl phthalate | 50 | 50 | 50 | 50 | 50 | 50 |
| "Mark M" | 0.75 | | 0.37 | | | |
| Reaction product of diethylene glycol and 3-cyclohexenyltrichlorosilane | | 0.75 | 0.40 | | 0.66 | 0.33 |
| Stearic acid | 0.33 | 0.33 | 0.33 | 0.33 | 0.33 | 0.33 |
| Basic white lead silicate | | | | 0.66 | | 0.33 |
| Total | 151.08 | 151.08 | 151.10 | 150.99 | 150.99 | 150.99 |
| Mill heat stability test at 330° F. (minutes) | 60 | 15 | 45 | 10 | 3 | 10 |

The foregoing examples are repeated, using the reaction products of Examples 2, 4 and 5 of 2,680,124 or Examples 1, 2, 3, 4 and 5 of 2,831,828 with equivalent results. Any of the hydrocarbon halosilane-aliphatic oxygen compound reaction products of 2,680,124 or 2,831,828 may be compounded with vinyl chloride resin containing clay filler, in accordance with the present invention, and will produce a composition that is remarkably resistant to deterioration by heat.

Having thus described our invention, what we claim and desire to protect by Letters Patent is:

1. A heat-stabilized resin composition comprising polyvinyl chloride resin, from 5 to 300 parts of clay per 100 parts of said resin, and a liquid reaction product of a hydrocarbon halosilane and an excess of an aliphatic oxygen compound, said halosilane being selected from the group consisting of saturated aliphatic and cycloaliphatic hydrocarbon halosilanes, cycloalkenylhalosilanes, cycloalkenylalkylhalosilanes and omega - alkenylhalosilanes wherein the alkenyl group contains at least six carbon atoms, and said oxygen compound being selected from the group consisting of saturated aliphatic monohydric and dihydric alcohols, and oxiranes having the formula

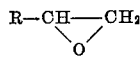

wherein R is selected from the group consisting of hydrogen, methyl and ethyl, the said product being present in amount of from 2 to 6 parts per 100 parts of said filler.

2. A heat-stabilized resin composition as in claim 1 in which the said halosilane is 3-cyclohexenyltrichlorosilane and the said oxygen compound is diethylene glycol.

References Cited in the file of this patent
UNITED STATES PATENTS

| | | |
|---|---|---|
| 2,645,624 | Hunter | July 14, 1953 |
| 2,680,124 | Brooks et al. | June 1, 1954 |
| 2,831,828 | Brooks et al. | Apr. 22, 1958 |
| 2,890,190 | Van Volkenburgh | June 9, 1959 |
| 2,912,397 | Houska et al. | Nov. 10, 1959 |
| 2,949,439 | Fuchsman et al. | Aug. 16, 1960 |